United States Patent
Landolt et al.

(10) Patent No.: US 10,654,672 B2
(45) Date of Patent: May 19, 2020

(54) TRANSPORT DEVICE FOR STACKING PARTIAL BOOK BLOCKS

(71) Applicant: Mueller Martini Holding AG, Hergiswil (CH)

(72) Inventors: Michael Landolt, Reiden (CH); Matthias Gut, Nebikon (CH)

(73) Assignee: MUELLER MARTINI HOLDING AG, Hergiswil (CH)

(*) Notice: Subject to any disclaimer, the term of this patent is extended or adjusted under 35 U.S.C. 154(b) by 0 days.

(21) Appl. No.: 16/197,414

(22) Filed: Nov. 21, 2018

(65) Prior Publication Data
US 2019/0161297 A1    May 30, 2019

(30) Foreign Application Priority Data
Nov. 28, 2017 (CH) ........................... 1446/17

(51) Int. Cl.
*B65H 39/043* (2006.01)
*B65G 37/00* (2006.01)
(Continued)

(52) U.S. Cl.
CPC .............. *B65H 5/006* (2013.01); *B42C 19/08* (2013.01); *B65G 37/005* (2013.01); *B65G 43/08* (2013.01);
(Continued)

(58) Field of Classification Search
CPC ........ B65G 43/08; B65G 47/31; B65G 47/38; B65G 37/00; B65G 57/08; B65G 57/03;
(Continued)

(56) References Cited

U.S. PATENT DOCUMENTS 2,886,929 A * 5/1959 Villemont .............. B65H 3/042
53/438
3,978,571 A * 9/1976 Orlando ................ H01M 10/14
29/730
(Continued)

FOREIGN PATENT DOCUMENTS

CH    374968 A    2/1964
EP    2233312 A1   9/2010
(Continued)

*Primary Examiner* — James R Bidwell
(74) *Attorney, Agent, or Firm* — Leydig, Voit & Mayer Ltd.

(57) ABSTRACT

A transport device stacks partial book blocks along a transport path formed of transfer paths, and includes: a first transfer path at a start of the transport device; a first separating element downstream of the first transfer path and upstream of a second transfer path; a second separating element downstream of the second transfer path and upstream of a processing machine that is operatively connected to the transport device; and a transition path which is arranged either upstream or downstream of the second separating element and within which a book block product that is to be introduced therein is transferable from a transport position where it is lying flat and into a transport position where it is guided standing up. At least one of the transfer paths is equipped with at least one sheet stack feed unit and/or at least one collator-feeder.

21 Claims, 5 Drawing Sheets

(51) Int. Cl.
 B65G 43/08 (2006.01)
 B65H 47/31 (2006.01)
 B65H 7/00 (2006.01)
 B65H 31/30 (2006.01)
 B65H 5/00 (2006.01)
 B65H 39/055 (2006.01)
 B42C 19/08 (2006.01)
 B65G 47/38 (2006.01)

(52) U.S. Cl.
 CPC ............ B65G 47/31 (2013.01); B65G 47/38 (2013.01); B65H 7/00 (2013.01); B65H 31/3054 (2013.01); B65H 39/043 (2013.01); B65H 39/055 (2013.01); B65H 2301/4452 (2013.01); B65H 2301/4473 (2013.01); B65H 2301/4476 (2013.01); B65H 2404/2691 (2013.01); B65H 2513/10 (2013.01); B65H 2513/21 (2013.01); B65H 2701/182 (2013.01); B65H 2701/18262 (2013.01)

(58) Field of Classification Search
 CPC .. B65G 37/005; B65H 39/043; B65H 39/055; B65H 5/006; B65H 7/00; B65H 2701/182; B65H 31/3054; B65B 35/50; B42C 19/08

USPC ......... 414/788.7, 789.3, 789.6, 790.7, 791.1; 198/418.1

See application file for complete search history.

(56) References Cited

U.S. PATENT DOCUMENTS

| 5,454,687 | A | * | 10/1995 | Johnson | ................ | B65G 57/32 198/370.1 |
| 5,997,238 | A | * | 12/1999 | Garrard | ................. | B65G 57/32 198/431 |
| 2013/0064626 | A1 | * | 3/2013 | Buntemeyer | ...... | B65H 31/3018 412/1 |
| 2014/0360839 | A1 | | 12/2014 | Moesli et al. | | |
| 2015/0197403 | A1 | | 7/2015 | Moesli et al. | | |

FOREIGN PATENT DOCUMENTS

EP 2810904 A1 12/2014
EP 2883820 A1 6/2015

* cited by examiner

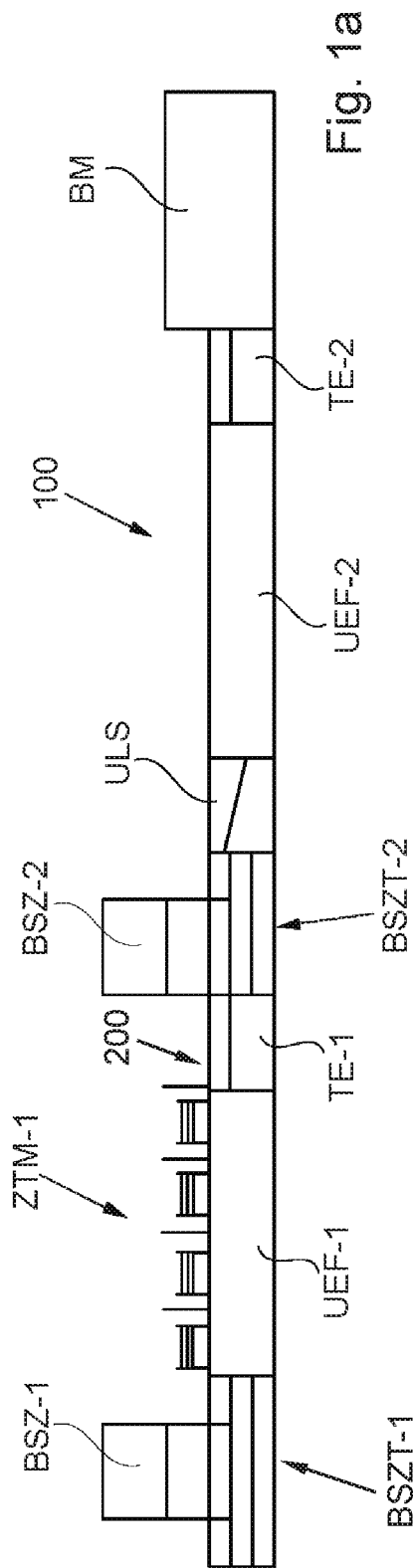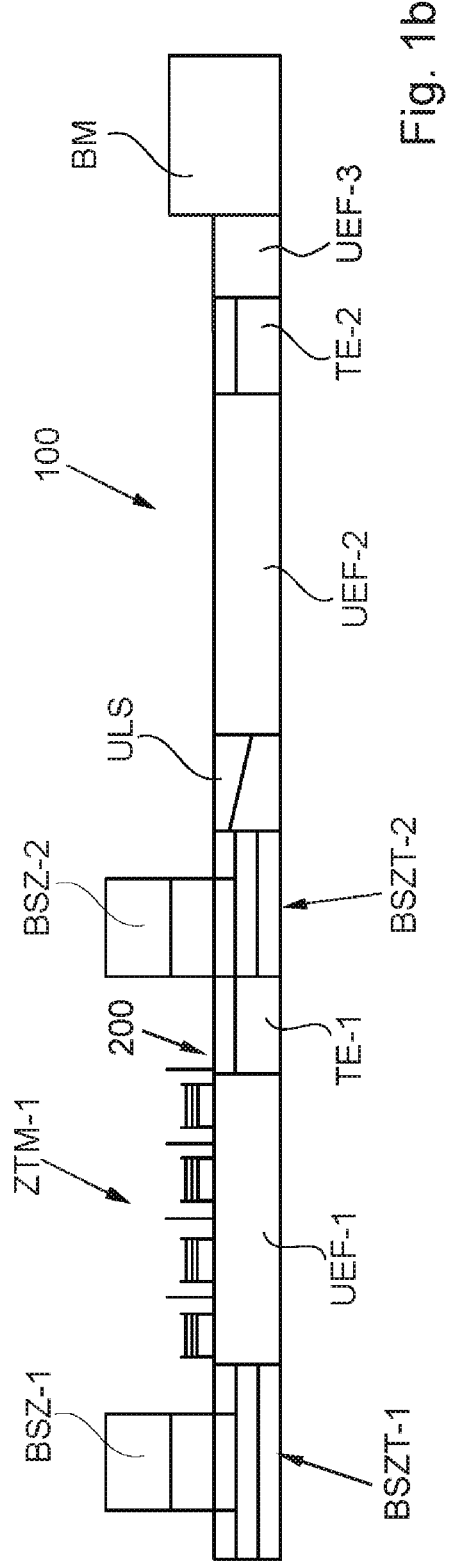

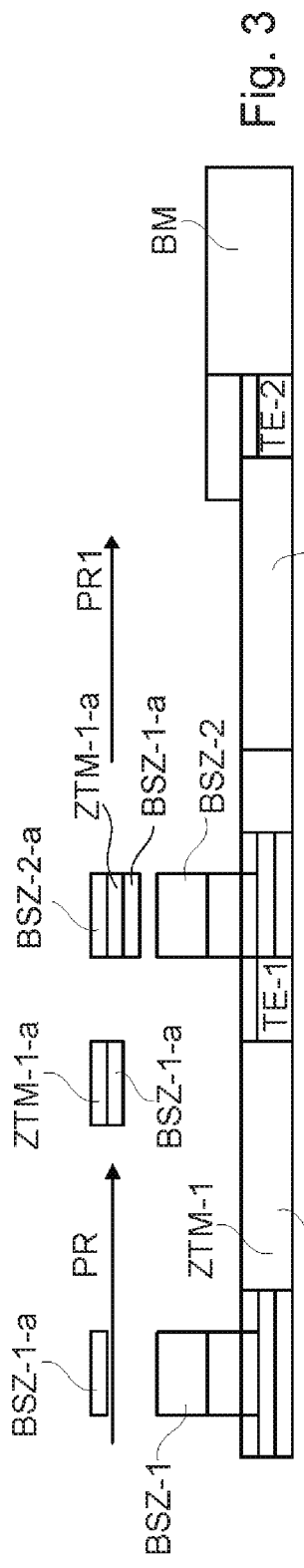
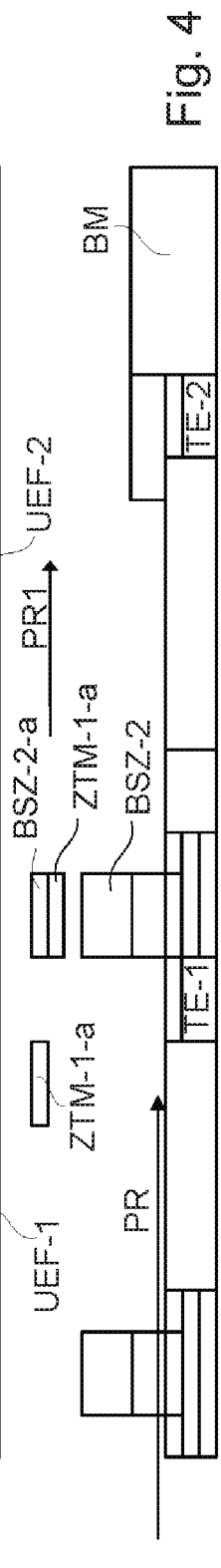
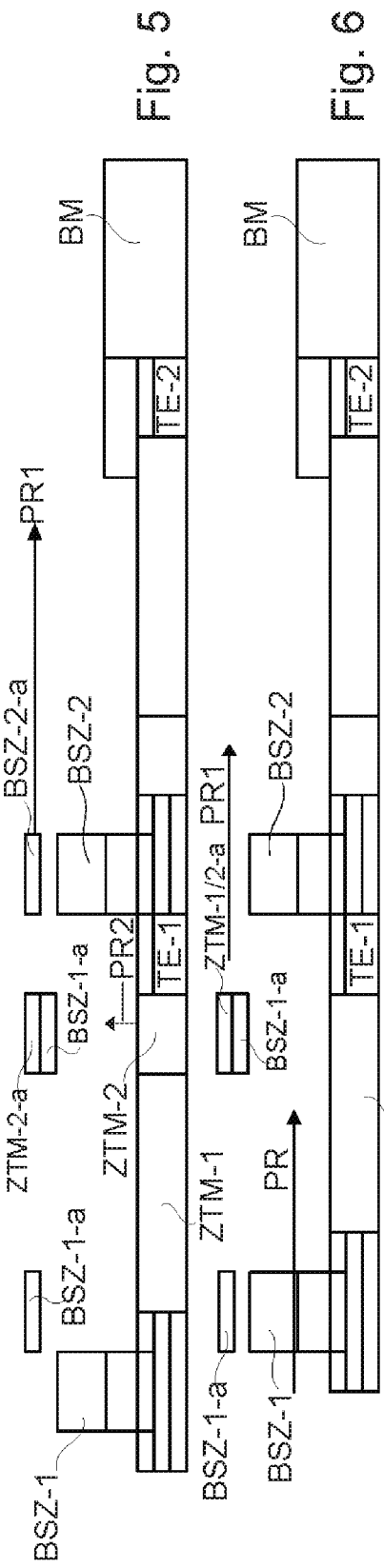
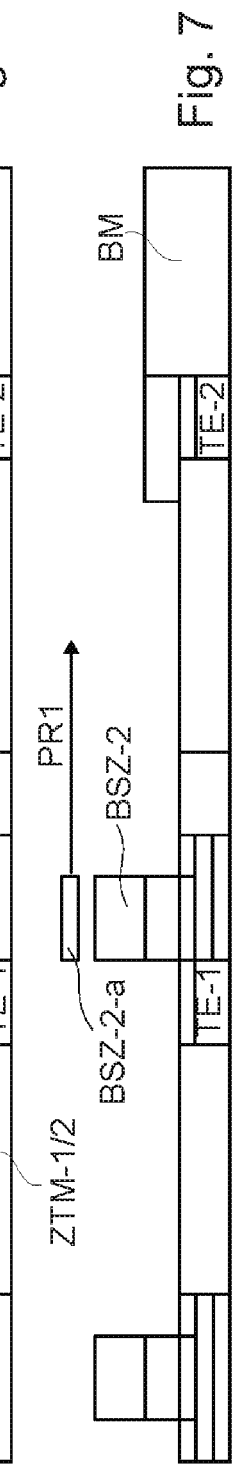
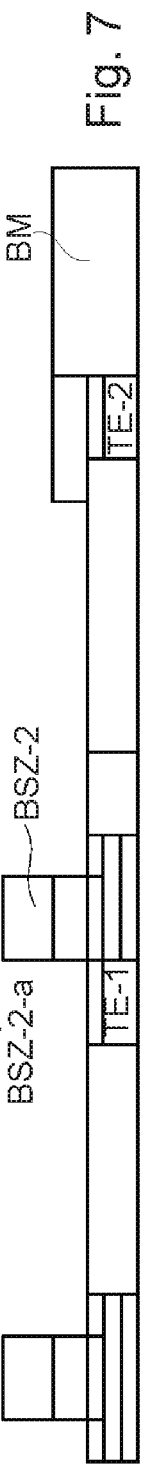

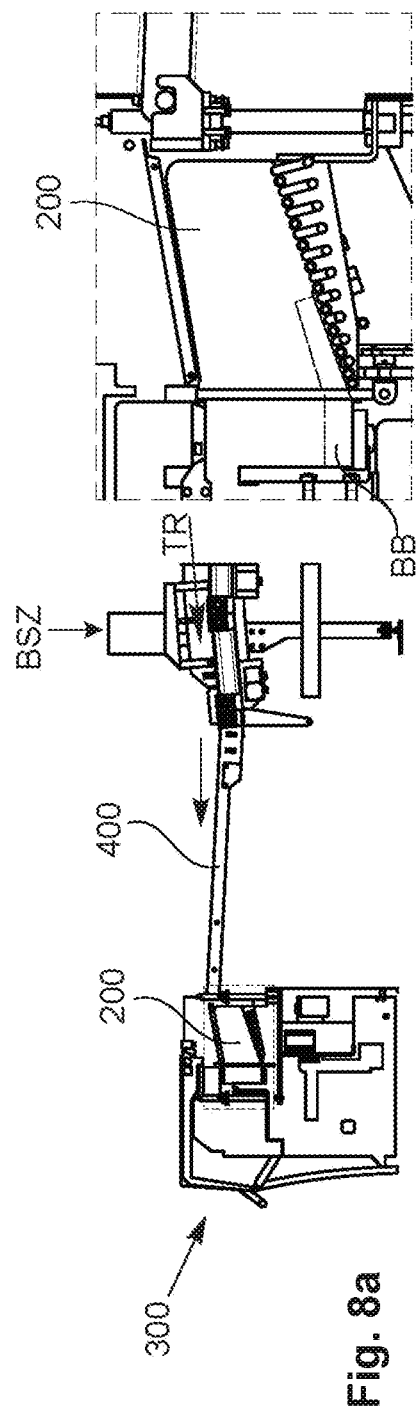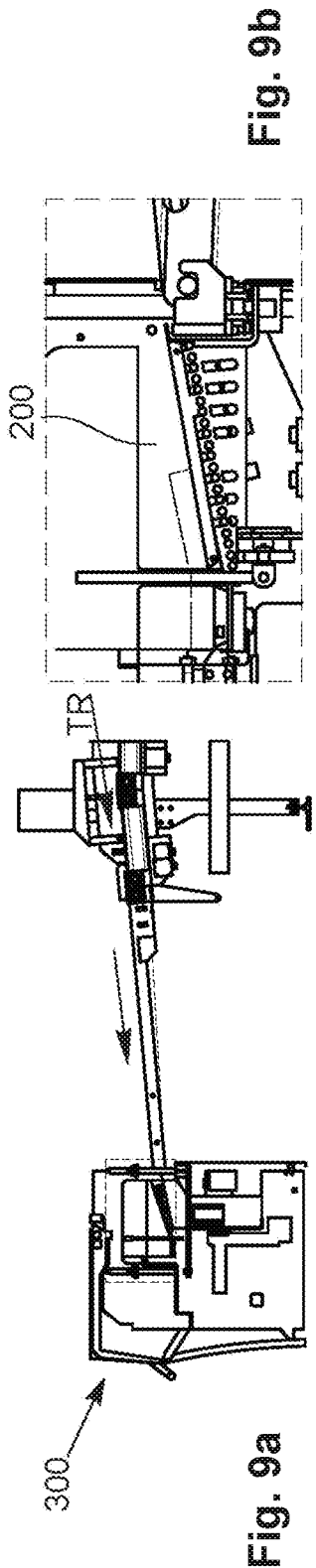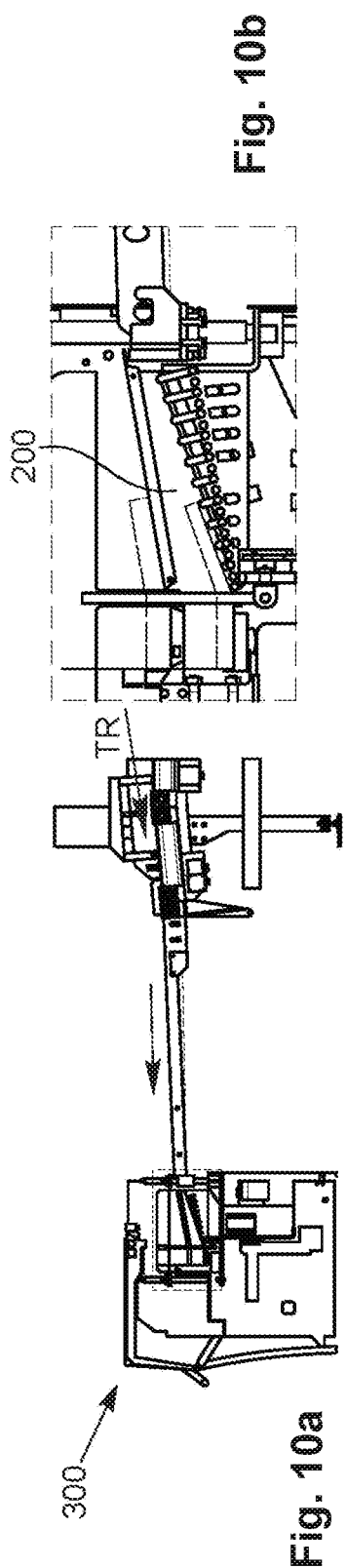

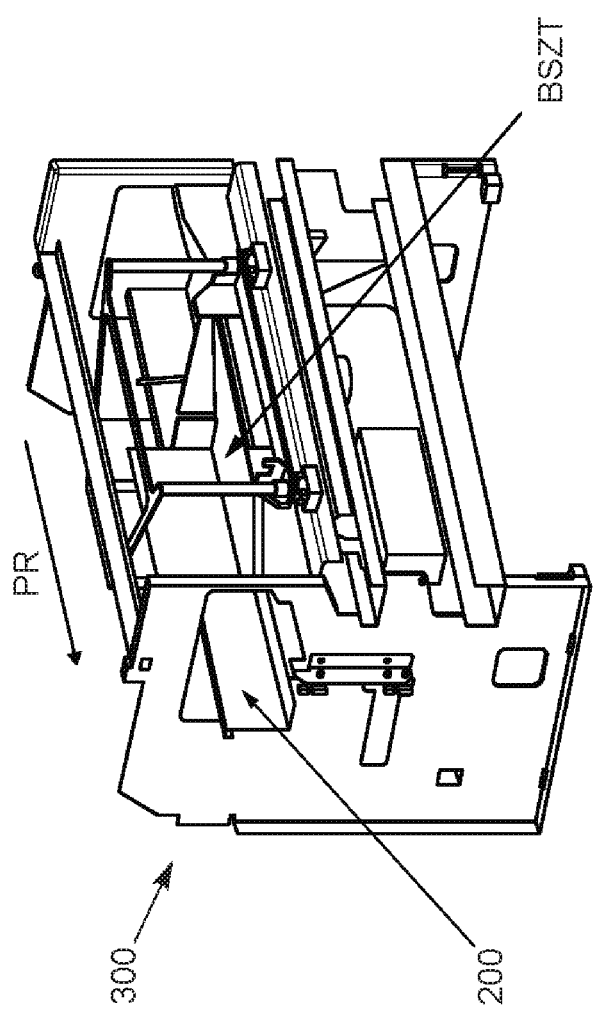

ial book blocks that are flatly stacked on top of one another, irrespective of the plane from which the partial book blocks are fed. The flatly stacked partial book blocks are also conveyed along the transport device in this state, and their position is not adapted to the requirements of a downstream processing machine until an end phase, i.e.

TRANSPORT DEVICE FOR STACKING PARTIAL BOOK BLOCKS

CROSS-REFERENCE TO PRIOR APPLICATIONS

Priority is claimed to Swiss Patent Application No. CH 01446/17, filed on Nov. 28, 2017, the entire disclosure of which is hereby incorporated by reference herein.

FIELD

The invention relates to a transport device for stacking partial book blocks along a transport path.

BACKGROUND

EP2883820 A1 discloses a transport apparatus for book blocks. In this document, the transport apparatus includes an accumulating conveyor, which is arranged downstream of the feed conveyor, is connected to the controller and is operated at a first speed, on which accumulating conveyor a plurality of book blocks can be transported at the first speed such that they rest against one another without any gaps. Furthermore, the transport apparatus includes a synchronizing conveyor, also known as a handover element, which is arranged downstream of the accumulating conveyor, is connected to the controller and is designed for transporting a single book block in each case, it being possible to hand over a single book block from the accumulating conveyor to the synchronizing conveyor at the first speed in each case. In this case, the book block can be accelerated from the first speed to a second speed by means of the synchronizing conveyor, can be transported to the dispatch conveyor at the second speed and can be handed over to the dispatch conveyor between two successive carriers.

In one embodiment of this transport apparatus, a forward conveyor that is connected to the controller and can be driven at a variable speed is arranged downstream of the synchronizing conveyor and upstream of the dispatch conveyor. In this case, at least one book block can be received at the synchronizing conveyor speed and handed over from the forward conveyor to the dispatch conveyor. A device for detecting the position and/or format of the book block, in particular its dimensions in the production direction, is arranged in the region of the forward conveyor, it being possible to compare a value resulting from the detection with a default value that is known to the controller, and the result of the comparison can be used to change the speed of the forward conveyor. This is advantageous in that, as a result of the variable change in speed of the forward conveyor, book blocks can be handed over, one after the other, with greater accuracy between two successive carriers of the dispatch conveyor.

Within the context of the transport apparatus, the synchronizing conveyor can be provided with a drive, at least one sensor being arranged in the region of the synchronizing conveyor for detecting the position of the book block on the synchronizing conveyor, and the drive and the at least one sensor being connected to the controller. The drive of the synchronizing conveyor can therefore also be accelerated or decelerated in accordance with the data relating to the position of the book block on the synchronizing conveyor, which data is transmitted from the sensor to the controller.

EP2810904 A1 then discloses a method and an apparatus for cyclically feeding a book block to a processing station, which book block is formed of at least one print sheet and is transported lying down. The book block is handed over by means of a first transport device to a transport channel of a second transport device, which channel includes a bearing surface. The book block is then received by a transport finger arranged in a gap in the transport channel and fed to the processing station, for which purpose the first transport device engages in a recess in the transport channel. In this case, a comb-like insertion flap is pivoted out of a first position for receiving the book block from the transport means, and into a second position for handing the book block over to the transport channel of the second transport device.

SUMMARY

An embodiment of the present invention provides a transport device that stacks a plurality of partial book blocks along a transport path formed of transfer paths, where a finished stacked book block product is feedible to a processing machine. The transport device includes: a first transfer path of the transfer paths which is arranged at a start of the transport device; at least a first separating element which is downstream of the first transfer path and is upstream of at least a second transfer path of the transfer paths; a second separating element which is downstream of the second transfer path and is upstream of the processing machine that is operatively connected to the transport device; and a transition path which is arranged either upstream or downstream of the second separating element and within which a book block product that is to be introduced therein is transferable from a transport position where it is lying flat into a transport position where it is guided standing up. At least one of the transfer paths is equipped with at least one sheet stack feed unit and/or at least one collator-feeder.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1a shows a transport device;
FIG. 1b shows another transport device;
FIGS. 3-7 show different embodiments;
FIGS. 8a-10b are views showing the different positions of the sheet stack feed tables;
and
FIG. 11 shows a feed unit.

DETAILED DESCRIPTION

Figure 2:
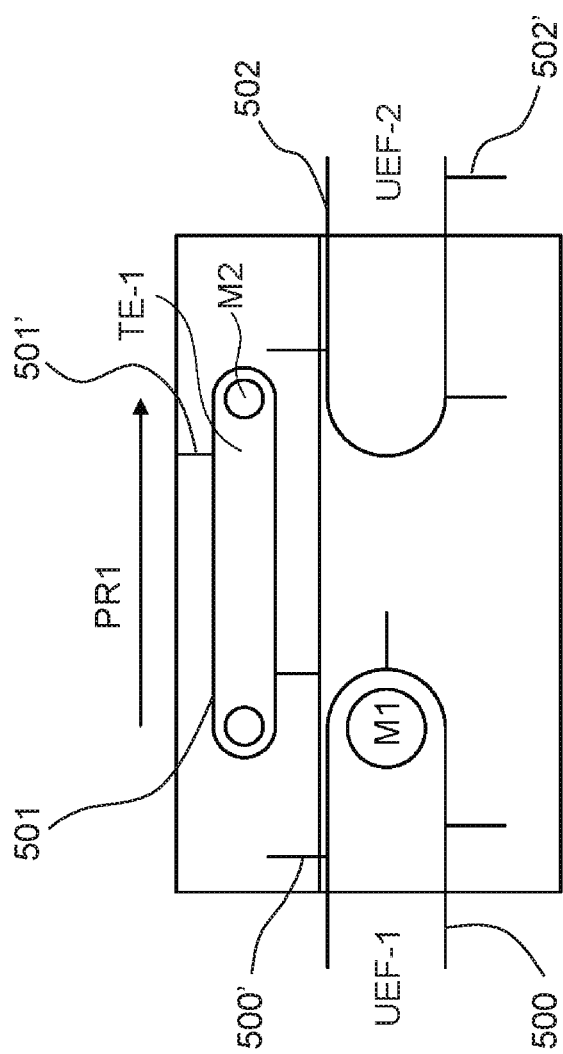
FIG. 2 is a schematic view of a structure of a first separating element.

Embodiments of the present invention provide a transport device by means of which loose partial book blocks that are fed one after the other are stacked at high speed, this feeding relating to partial book blocks that are flatly stacked on top of one another, irrespective of the plane from which the partial book blocks are fed. The flatly stacked partial book blocks are also conveyed along the transport device in this state, and their position is not adapted to the requirements of a downstream processing machine until an end phase, i.e.

they are preferably transferred from a state where they are lying flat into a vertical position.

According to the present invention, the loose partial book blocks, introduced one after the other, are first introduced into a book channel (horizontal channel), which also extends in a planar manner, so as to lie flatly on top of one another and interlock, this technique differing fundamentally from those in which the book blocks are transported along an "upright channel" throughout, i.e. lying on the book spine.

In principle, the book channel is formed by a series of preferably successive transfer paths, also called transport paths, which are operated in a segmented manner, which leads to an advantageous degree of operating autonomy. The finished assembled book block product that is transported lying flat is only transferred to a different position as it nears the end of the book channel for the sake of the requirements of the subsequent processing machine.

According to the invention, this relates to stacking a book block product along a transport device such that, as a result of the additional operation of separating elements inside the transport device, those requirements are then met which allow the book block product to be transferred to a subsequent processing machine in an ordered, cycle-accurate, cycle- and position-compliant manner.

The loose partial book blocks, which are introduced into a first transfer path in the production direction from a first sheet stack feed unit consisting of digital printing or non-digital printing products, for example pre-compiled conventional products, are guided over a subsequent collator-feeder, where additional individual pages or sheets are added. If the process of stacking the book blocks is deemed complete after this collator-feeder, this book block product is then fed to a perfect binder, a book sewing machine or some other processing machine for additional manufacture.

However, if this process of stacking partial book blocks is still not deemed complete, an additional sheet stack feed unit is provided downstream of the collator-feeder, by means of which additional unit additional partial book blocks are added to the loose book block packet formed up until this point.

The reference to loose partial book blocks does not exclude the fact that, if necessary, parts of the partial book blocks are bonded in a targeted manner by means of a bonding process, at least at the spine, for intertemporal book block formation.

The end book block is made up of different partial book blocks (book block product) and inherently is formed in a careful manner in order to ensure that the finished stacked book block product retains its stacking homogeneity on its way to a downstream processing machine, and therefore, when introducing the book block product into the subsequent processing machine, for example a perfect binder, book sewing machine, etc., no more alignment measures have to be taken in this regard.

In order to transport the partial book blocks or book block products lying down, additional collator-feeders and/or sheet stack feed units can in principle be added to the transport device, and can be used for the relevant book block product either integrally or only at points, i.e. such feed stations can easily be bypassed when forming the book block product, if necessary.

When operating such a transport device that is designed for transporting the partial book blocks lying down in order to form an end book block with the assistance of a plurality of feed stations (sheet stack feed units, collator-feeders, etc.), additional measures have to be added to ensure that the operation can run without interruption.

Using the example of a book channel formed of transfer paths and designed for transporting the book block products lying down, the aforementioned sheet stack feed units, collator-feeders, etc., and separating elements are provided in the production direction and are arranged at regular or random intervals.

A typical conveying continuity can consist in a first collator-feeder being arranged downstream of a first sheet stack feed unit, on which feeder a first separating element already acts. The subsequent conveying continuity can be repeated in accordance with this specification or the feed elements can be arranged in any order, these generally being assigned, either individually or in combination with one another, to a transfer path that operates independently.

To be specific, this means that a first autonomously and interdependently operable separating element is already provided downstream of a first transfer path which extends over the first sheet stack feed unit and/or the collator-feeder, which separating element intervenes by ordering, if necessary, if the subsequent units are to be operated in a cycle-compliant manner.

For an autonomously and interdependently operable separating element, it is therefore pointed out that its function clearly consists in conveying the loose partial book blocks formed thus far, which are lying down, from a preceding transfer path to a downstream transfer path in a continuous and interlocking manner, but not necessarily in compliance with the cycles of the preceding operation.

On the other hand, this separating element is also able to separate the transfer of the book block product from a preceding transfer path to a downstream transfer path in terms of conveyance such that the two paths can then be operated autonomously.

If the separating element therefore has to fulfil the function of conveying the book block product from a preceding transfer path to a downstream transfer path according to specific criteria, measures therefore have to be taken in order to enable the separating element to achieve different speed profiles, depending on requirements. In this case, not only should the cycle specification across the various transfer paths be taken into consideration, but also the product lengths and, if need be, also additional properties (paper structure, etc.) of the loose partial book blocks.

Accordingly, the make-up of the transport device includes a transport path that is formed of transfer paths and is normally equipped with the following elements, specifically: i) a first transfer path which is operatively connected to at least a first sheet stack feed unit and at least a first collator-feeder; ii) a first separating element which is downstream of the first transfer path; iii) a second transfer path that follows the first separating element and is operatively connected to at least a second sheet stack feed unit; iv) a second separating element which is downstream of the second transfer path; v) a third transfer path which provides the positional make-up of the book block product for the subsequent processing machine no later than this point; and vi) where this make-up is preferably formed by a transition path which can also be readily arranged upstream of the last separating element.

Proceeding from such a transport path, which cannot be considered complete, the following objects and operating modes that belong to the invention can be identified:

A continuous operating mode of the transport path accordingly consists in all of the elements operating effectively and at the same time. However, in this operating mode the consistency of the individual partial book blocks does not necessarily have to be uniform, i.e. even though all the feed elements contribute to the formation of a finished book block product for a downstream processing machine, their specific proportions can be different from the particular finished book block, and therefore there can be absolutely no intermediate use in the case of individual feed elements. This is the case, for example, when a collator-feeder does not remove all the possible individual pages or sheets which would inherently be possible.

A first, purposefully restricted operating mode of the transport device consists in the situation whereby the first transfer path, together with its sheet stack feed unit and/or collator-feeder, is bypassed, and only the second sheet stack feed unit functions, whereby the first separating element is either not present or has been put out of operation. However, this should not be considered absolute, since, when feeding different successive partial book blocks, the elements that are not directly in operation can be intermediately repeatedly selectively activated, if necessary, and thus it is possible to switch to a continuous operation at any time.

The operation is also restricted when, although the first sheet stack feed unit is not in operation, the collator-feeder is. For such an operation, the first separating element is then fully operational, which then ensures that the removed individual pages or sheets can be handed over from the collator-feeder, even when they are delivered intermittently, to the second transfer path in a position- and cycle-compliant manner, at which point the feed from the second sheet stack feed unit can then be added thereto. It is obvious that the activation of this second sheet stack feed unit directly triggers kinematic-operative effects on the operation of the second separating element, which are described below.

A quasi-continuous operating mode is provided, for example, when the second sheet stack feed unit does not make any contribution and is therefore temporarily or continuously out of operation. Therefore, the operation of the transfer path after the first separating element can be continuously operated for the subsequent feed elements in sync, i.e. the second separating element conveys the book block products synchronously to the cycle that is set by the second transfer path, which affects the third transfer path that serves as a transition to the processing machine.

Such a subdivided transport path is also advantageous in that partial book blocks can be diverted out of the flow path at any time, for example after the first separating element and/or after the feed from the collator-feeder. These interventions can be caused by different specifications, for example when the controller intervenes due to a lack of detected quality and discards the product beforehand, or if the controller actively plans such a diversion because the present book block product is intended to be fed to a different processing machine, for example. It is clear therefrom that a large degree of operational flexibility results in particular from the described subdivision of the transport device into different transfer paths, feed elements and separating elements.

Such a segmented transport device also has the advantage that customer-specific systems can be offered beforehand, which are advantageous for the customer since such transport devices can be easily extended and expanded at any time, at least with the elements and units described.

Such a transport device constructed in this way is also advantageous in that individual additional book blocks do not necessarily have to be fed from the vertical, but can be fed laterally with respect to the production direction equally well, provided that special measures are taken which likewise enrich the prior art.

If the book blocks are accordingly laterally fed in this way, all that needs to be ensured is that the handover planes of the different partial book blocks can be height-adjusted with respect to the transport plane (book channel) of the transport device by corresponding partial-book-block-guiding sheet stack feed tables and can, in a maximum number of cases, be brought into line with the partial book blocks queueing in the book channel. Therefore, on the one hand, measures have to be taken which provide both an upward and downward height adjustment, and, on the other hand, operational adaptations also have to be made so that the handover takes place in a cycle-compliant manner or in operative connection with the partial book block queuing in the book channel.

When stacking the partial book blocks that lie flatly on top of one another, the stacking process can take place in motion when a partial book block is being handed over, i.e. it does not necessarily have to take place when the machine is inoperative.

In this case, the height-adjustable sheet stack feed unit generally includes three different operating modes, in particular: i) for a passage operation, the sheet stack feed unit or its sheet stack feed table is in the top position; ii) for an insert operation, the sheet stack feed unit is in the bottom position; iii) for an addition operation, the height of the sheet stack feed unit is adapted to the height of the partial book block. In this case, the idea is that the feed of the partial book block to be stacked in each case is provided by the sheet stack feed unit and/or the collator-feeder and, with respect to the transfer path, is carried out with an inclination interdependency between the units involved.

With regard to the book channel of the transport device, the inclination thereof can be adjusted. The inclination is ordinarily an inclination of up to 30° so that the book block product can be optimally transported in the channel. In this context, however, it has to be taken into consideration that, if guided via the book channel or the sheet stack feed tables, the loose partial book blocks have low adhesion coefficients, are slightly instable and can slide apart. For this reason, the sheet stack feed table is intended to have an inclination of no more than 10°. This then presupposes that, during the insert operation (see iii above), the guiding by means of the sheet tack feed table is as close to the book channel as possible, and therefore an inclination of 10° can preferably also be provided at least for the latter operating mode.

Therefore, with regard to the dynamics of the stacking process, i.e. of the so-called synchronizing, an inclination interdependency prevails between the two units, the book channel/sheet stack feed table, such that the sheet stack includes a series of bands which ensure synchronizing over the sheet stack feed table, and that the partial book block is transported in the book channel such that the stacking process occurs by a finger chain which operates interdependently between the sheet stack feed table and the book channel, and therefore maintains the conveyance of the particular product.

It is obvious that, in such a comprehensive operation, at least two separating elements are provided which are dynamically operatively connected to the transfer paths, i.e. the transfer of the particular partial book block from one transfer path to another is intended to be ensured; this transfer being of an intermittent nature in most cases, but continuous transfer is not ruled out.

Accordingly, the invention cannot be considered without the separating elements, which form an essential component for transferring the book block products in a channel designed for transporting the products in a manner in which they are lying flat, in that the separating element generally acts as a bridge, as it were, as a connection between a preceding transfer path and a subsequent transfer path in the production direction; the focused transport device, as mentioned, also being able to include a plurality of separating elements.

The separating element driven by a servomotor makes it possible for the book block products to be handed over from a finger chain that operates in the first transfer path to the finger chain of the second downstream transfer path.

The finger chain of the separating element in principle picks up the book block products, removing them from transport, along a preceding transfer path; these book block products are then conveyed further over the transport path defined by the separating element by the finger chain, and are then handed over to a downstream transfer path in a cycle-accurate manner.

As a result of the different chain separating possibilities, the servomotor is able to achieve several different speed profiles, the servomotor preferably being controlled according to stored control profiles. Regardless of this, control profiles are also available that can operate the controller of the system, either adaptively or predictively, inside the separating elements.

On the one hand, the partial book blocks are stacked one on top of the other so as to interlock, on the other hand they are all transported along the book channel one after the other, i.e. the distance in the production direction between the individual partial book blocks and later in finished packaged book block products tends to zero, i.e. in general, the book block products almost collide, i.e. a format and thickness dependency does not influence the spacing between the book block products in the production direction. This has the essential advantage that a changeover does not have to be carried out when producing different book block products.

If need be, the control profiles are able to orient the movement profile inside the entire transport unit according to the product format, i.e. for shorter product lengths, for example, the intermediate accelerations in the production direction can be reduced.

The carrier fingers that operate in the separating element are advantageously intended to assume a position assigned to them, which is very restricted, so that a dynamized pivoting movement in the area around the book block products remains ruled out while they are being used.

Another essential advantage of the invention can be considered that of the book block products that are guided lying down inside the separating element and in front of and behind the element representing a real technological enrichment with respect to the known transport devices.

Furthermore, it is also not essential to make adjustments inside such separating elements due to the different formats of the book block products. Accordingly, the servomotor used also means that, in the separating element, mechanical transmissions do not have to be exchanged when the finger chains are separated differently.

The aim of the invention is therefore to provide a plurality of individually designed separating elements which are provided for operating a transport device and are designed for stacking a plurality of partial book blocks in order to form a book block or more generally a book block product along a book channel that belongs to the transport device in such a way that the finished stacked book block can then be fed to a processing machine in accordance with preset criteria.

As already summarized, the first separating element that can be operated using at least one drive receives a partial book block, which is fed from the preceding transfer path lying flat, this is then transported further, lying flat, via the conveying path formed by the first separating element, and then handed over to the downstream transfer path lying flat and in a cycle-compliant manner.

In this case, a second downstream separating element that includes at least one independent drive also receives a partial book block that is already standing up from the preceding transfer path, further transports it, standing up, via the conveying path formed by the second separating element, and then hands it over to the downstream transfer path, standing up and in a cycle-compliant manner, where the last-mentioned transfer path, which can then be very short, is upstream of the processing machine. Therefore, these embodiments highlight the fact that the transport device contains different separating elements, which, despite following the same transfer strategy and fulfilling the same aim in principle, include different embodiments per se with regard to the way in which the individual partial book blocks are transported further.

In particular, the separating elements provided for use as a connection between two transfer paths include an integrally continuous or segmented finger chain along their conveying paths for transporting the partial book blocks, which chain in turn includes carrier fingers that firstly assume a vertical or quasi-vertical orientation for the partial book block that is guided lying flat. Once these book block products that are guided lying flat have generally been transferred to a position where they are guided standing up, once in this new position the maxim applies that the carrier fingers have to have a horizontal or quasi-horizontal orientation, and this applies in particular to the second or last separating element before the processing machine.

These carrier fingers are mounted on the finger chain so as to be rotatable and movable in a circumferential direction, and extend almost in parallel with the movement direction. The length of the individual carrier finger is >150 mm starting from the channel base, as a result of which high circumferential speeds result during pivoting. Furthermore, the spacings between the transported book blocks are intended to be as small as possible so that the book blocks cannot shift.

For this purpose, a transition path is preferably provided following the operation of a final sheet stack feed unit designed for flat feeding, inside which transition path the book block product inserted therein is transferred from a transport state where it is lying flat into a transport where it is guided standing up (on the spine of the book). Therefore, if a second or additional separating element is arranged downstream of this transition path, which element occasionally acts as the last separating element before the processing machine inside the transport device shown, these very book block products are generally guided, standing up, over the conveying path thereof.

By means of this measure, it is possible for the transfer path that is arranged downstream of the last separating element to be extremely short, as already mentioned, since the book block products are therefore already in the position that is predetermined for the processing machine, and therefore additional arrangements no longer need to be made in this regard.

With regard to the apparatus, it is now clear why the last separating element is characterized by the carrier fingers being guided in a different way to in a preceding separating element.

The process of conveying of the partial book blocks to be stacked or the finished stacked book block over the first and/or second separating element is guided in a cyclically monotonous, synchronous or intermittent manner with respect to the cycle of the transfer paths both upstream and downstream of the separating elements; it is therefore clearly expressed here that these separating elements intrinsically perform an ordering function on a possible intermittent cycle when transporting the book block products along the rest of the transfer paths of the transport device.

The arrangement of the separating elements inside the transport device then meet additional ordering functions which relate to the process of stacking the partial book blocks: in order to ensure the transport-dependent ordering function of the separating elements, the elements are arranged inside the transport device such that the upstream or downstream transfer path is equipped at least with a sheet stack feed unit and/or at least one collator-feeder, the ordering function of the separating elements strongly entering into function when the feed of the partial book blocks to be stacked is provided, with respect to a specified transfer path, both vertically and laterally with respect to the production direction of the transport device, i.e. in these cases, the separating elements have to intervene, by ordering, for the potentially occurring imponderables when feeding and further transporting the book block products.

If the respective partial book blocks to be stacked are laterally fed, the control unit intervenes by means of targeted control commands in order to adjust the height of the sheet stack feed unit to match the current detected height of the partial book block arriving in the transfer path lying flat (see above). In this process, cycle irregularities may easily occur, which can then be "smoothed out" by the separating elements.

Furthermore, the separating elements have to orient the transported book block products within the conveyor path thereof when necessary. Although it is correct that in particular the book block products transported lying flat have a stabilizing position-maintaining inclination within the transfer paths, which is defined as up to 30°, preferably 20°±5°, preferably up to 10°, irregularities, which can be related to the accelerations or decelerations of the book block products during the transport and stack formation, can still occur regardless, even with this position-maintaining inclination, this being remedied by the separating elements so that the book block products are "settled down" at least after passing the corresponding separating element, also due to the fact that the speed profiles inside the separating elements are stable and act in a manner detached from the remaining speeds of the transport elements of the transport device.

The invention will be described in more detail in the following with reference to the drawings. All the elements that are not essential for directly understanding the invention have been left out. The same elements are provided with the same reference signs in the different figures.

FIG. 1a shows the make-up of a transport device 100 which is formed of transfer paths and of a series of feed elements. A first transfer path UEF-1, which is equipped with at least one sheet stack feed unit BSZ-1 and at least a first collator-feeder ZTM-1, is provided at the start of the transport device 100. In this connection, it is emphasized that the partial book blocks are first flatly stacked on top of one another, irrespective of the plane from which the partial book blocks are fed. These flatly stacked partial book blocks are also conveyed along the transport device 100, in the book channel 200 thereof, in this state, and their position is not adapted to the requirements of a downstream processing machine BM until an end phase, i.e. these book block products are preferably transferred from a state where they are lying flat to a vertical position upstream of the processing machine BM.

A first separating element TE-1 (also called a handover element), which is upstream of a second transfer path UEF-2, is downstream of this first transfer path UEF-1, a second sheet stack feed unit BSZ-2 preferably being arranged at the start of this second transfer path UEF-2. The second transfer path UEF-2 mentioned is extended by a transition path ULS (not shown in more detail), which ensures, as already mentioned, that the book block product introduced therein can be transferred from a transport state in which it is lying flat, into a transport in which it is guided standing up (on the book spine).

A second separating element TE-2 arranged downstream of this transition path ULS is accordingly already provided with book block products, which are already in the preset book block position for the processing steps in the processing machine BM, and therefore this separating element TE-2 arranged right at the end can perform its original task, specifically intervening, by ordering, with respect to imponderables and faults in the book block products delivered so that the downstream processing machine BM can be fed with book blocks in the correct position and in a cycle-compliant manner This transition path ULS for changing the position of the book block products therefore must be arranged in front of the last separating element in the transport device.

FIG. 1b shows another transport device 100 including three transfer paths UEF-1, UEF-2, UEF-3, between each of which a separating element TE-1, TE-2 is arranged in the form of a connection. FIGS. 1a and 1b also schematically show that the feed elements, in particular the sheet stack feed units BSZ-1, BSZ-2, are operatively connected to the schematically shown positions of the sheet stack feed tables BSZT, which match the height of the partial book blocks fed from the different feed elements to that of the stack of book block products that is already located in the book channel. For this purpose, reference is made to FIG. 8-11.

FIG. 2 is a schematic view of the structure of the separating element TE-1 which is arranged between the first transfer path UEF-1 and the second transfer path UEF-2. As shown, the individual elements shown here are driven M1, M2 autonomously; the system controller can be used to match the speed profiles of the drives acting inside the transport device if need be.

Nevertheless, as a result of this uncoupling, the separating element TE-1 is able to independently fulfill the task assigned to it at any time, specifically that of influencing the flow of book block products by ordering, in order to receive a partial book block that is fed, lying flat, from the preceding transfer path UEF-1, to then guide it lying flat over the conveying path formed by the first separating element TE-1, and to then hand it over lying flat and in a cycle-compliant manner to the downstream transfer path UEF-2. Similar considerations also apply to the additional separating element TE-2. Accordingly, the separating elements TE-1, TE-2 are equipped with at least one finger chain 501 that rotates inside the particular separating element and includes carrier fingers 501', which have a vertical or quasi-vertical orientation along the partial book blocks that are guided lying flat, whereas they have a horizontal or quasi-horizontal orientation along the book block products that are guided standing up. The meaning of the production direction PR 1/2 is explained in more detail under FIG. 3-7.

These carrier fingers 501' are mounted on the finger chain 501 so as to be rotatable and movable in a circumferential direction, and they extend virtually in parallel with the movement direction. The length of the individual carrier finger 501' is >150 mm starting from the channel base, as a result of which high circumferential speeds result during pivoting. Furthermore, the smallest possible spacings are intended to be provided between the transported book blocks so that they cannot shift.

FIG. 3 shows a first production variant in which the end book block consists of a first partial book block BSZ-1-*a* which is provided by the first sheet stack feed unit BSZ-1. This is then subsequently stacked together with a second partial book block ZTM-1-*a* from the collator-feeder ZTM-1, and then an additional feed BSZ-2-*a* from the second sheet stack feed unit BSZ-2 is added in order to form an end book block, before the end book block is then forwarded in the production direction PR1. In this case, the additional elements remain unused in the book channel or are put out of operation.

FIG. 4 shows a second production variant in which the end book block consists of a first partial book block ZTM-1-*a* which is provided by the first collator-feeder ZTM-1. This is then subsequently stacked together with a second partial book block BSZ-2-*a* from the second sheet stack feed unit BSZ-2 before the end book block is then forwarded in the production direction PR1. In this case, the additional elements in turn remain unused in the book channel or are put out of operation.

FIG. 5 shows a third production variant in which the end book block consists of a first partial book block BSZ-1-*a* which is provided by the first sheet stack feed unit BSZ-1. This is then subsequently stacked together with a second partial book block ZTM-2-*a* from a second feed device ZTM-2 which directly follows the preceding collator-feeder ZTM-1. The end book block now formed in this way is then forwarded in the production direction PR2, it being possible for the end book block to be forwarded to a different destination, i.e. not necessarily to the processing machine BM, as is normally the case when the forwarding movement in the production direction is characterized by PR1. In this production variant, it is then still possible for a partial book block BSZ-2-*a* to be independently forwarded in the production direction PR1 from the second sheet stack feed unit BSZ-2. In this case, too, the rest of the elements remain unused in the book channel or are put out of operation.

FIG. 6 shows a fourth production variant in which the end book block consists of a first partial book block BSZ-1-*a* which is provided by the first sheet stack feed unit BSZ-1. This is then subsequently stacked with a second partial book block ZTM-2-*a* from a second feed device ZTM-2 which directly follows the preceding collator-feeder ZTM-1. This end book block is then forwarded in the production direction PR1. In this case, too, the rest of the elements remain unused in the book channel or are put out of operation.

FIG. 7 shows a fifth production variant in which the end book block merely consists of a partial book block BSZ-2-*a* which is provided by the second sheet stack feed unit BSZ-2 in order to then be forwarded in the production direction PR1. In this case, too, the rest of the elements remain unused in the book channel or are put out of operation.

FIG. 8-10 show the positions of the different sheet stack feed tables in different operating modes, the next figure, FIG. 11, specifically showing the feed unit 300. In this case, the height-adjustable sheet stack feed table BSZT (see FIG. 11) of the sheet stack feed unit BSZ together with the transport direction TR thereof generally includes three different operating modes: according to FIG. 8*a-b,* the sheet stack feed unit BSZ or the sheet stack feed table BSZT thereof are in the top position in a passage operation. This is clear from FIG. 8*a,* in which the height-adjustable transfer element 400 assumes the top position with respect to the book channel 200. FIG. 8*b* then shows that the conveyor plane of the book channel 200 assumes a passage position. This is different in an insert operation (FIG. 9)—the sheet stack feed unit BSZ is in this case (see FIG. 9*a-b*) in the bottom position. Furthermore, an additional height adjustment takes place when transferring to an addition operation. In this case, the height of the sheet stack feed unit BSZ, see FIG. 10*a-b,* undergoes an adaptation of the height of the sheet stack feed table BSZT to match the height of the partial book block. In this case, the idea is that the feed of the particular partial book block to be stacked (FIG. 8*b,* pos. BB), which is provided by the sheet stack feed unit BSZ and/or by the collator-feeder, reveals an inclination interdependency between the units involved, which is implemented with respect to the transfer path. The position of this partial book block BB is clear from the remaining figures, FIGS. 9*b* and 10*b.*

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A transport device for stacking a plurality of partial book blocks along a transport path formed of transfer paths, wherein a finished stacked book block product is feedible to a processing machine, the transport device comprising:
   a first transfer path of the transfer paths which is arranged at a start of the transport device;
   at least a first separating element which is downstream of the first transfer path and upstream of at least a second transfer path of the transfer paths; and
   a second separating element which is downstream of the second transfer path and is upstream of a third transfer path of the transfer paths;
   wherein the processing machine is downstream of the third transfer path, wherein a transition path is arranged upstream of the second separating element and within which the book block product that is to be introduced therein is transferable from a transport position where it is lying flat into a transport position where it is guided standing up, and wherein at least one of the transfer paths is equipped with at least one sheet stack feed unit and/or at least one collator-feeder.

2. A separating element for operating the transport device of claim 1, comprising at least the second separating element arranged inside the transport device as a connection between a transfer path arranged in front thereof and a downstream transfer path, wherein the separating element is configured to be operated using at least one drive and is configured to:

receive a book block product that is fed from the preceding transfer path standing up;

transport the book block product further, standing up, via a conveying path formed by the separating element; and then hand the book block product over to the downstream transfer path standing up and in a cycle-compliant manner.

3. A separating element for operating a transport device, wherein the transport device is for stacking a plurality of partial book blocks along a transport path formed of transfer paths, wherein a finished stacked book block product is feedible to a processing machine, wherein the transport device comprises:

a first transfer path of the transfer paths which is arranged at a start of the transport device;

at least a first separating element which is downstream of the first transfer path and is upstream of at least a second transfer path of the transfer paths;

a second separating element which is downstream of the second transfer path and is upstream of the processing machine that is operatively connected to the transport device; and a transition path which is arranged either upstream or downstream of the second separating element and within which a book block product that is to be introduced therein is transferable from a transport position where it is lying flat into a transport position where it is guided standing up; and wherein at least one of the transfer paths is equipped with at least one sheet stack feed unit and/or at least one collator-feeder, the separating element comprising at least the first separating element arranged inside the transport device as a connection between a transfer path arranged in front thereof and a downstream transfer path, and wherein the separating element is configured to be operated using at least one drive and is configured to:

receive a partial book block that is fed from the preceding transfer path lying flat;

transport the partial book block further, lying flat, via a conveying path formed by the first separating element; and then hand the partial book block over to the downstream transfer path lying flat and in a cycle-compliant manner.

4. The transport device according to claim 3, wherein at least the transfer paths are operable in a manner in which they are segmented.

5. The transport device according to claim 3, wherein a transport plane of a book channel of the transport device is formed having an inclination angle of up to 30°, 20°±5°, or up to 10°.

6. The transport device according to claim 3, wherein each partial book block to be stacked is feedible from a sheet stack feed table to a corresponding one of the transfer paths, with an inclination interdependency between the two units.

7. The transport device according to claim 3, wherein a process of stacking assigned partial book blocks on top of one another in order to form the finished stacked book block product inside the transport device is controlled by control profiles.

8. The transport device according to claim 3, wherein the respective partial book block to be stacked is feedible from at least one sheet stack feed unit and/or one collator-feeder vertically and/or laterally with respect to a production direction of the transport device that is formed by the transfer paths.

9. The transport device according to claim 8, wherein the respective partial book block to be stacked is fed laterally according to control profiles, an adapted adjustment being continuously carried out, when necessary, between a preset height of a partial book block located in the transfer path and a handover height of an additional partial book block which is guided by a height-adjustable sheet stack feed table of the sheet stack feed unit in each case.

10. The transport device according to claim 9, wherein the height-adjustable sheet stack feed table has three different operating modes, comprising:

a) for a passage operation: the sheet stack feed table is arranged in the top position;

b) for an insert operation: the sheet stack feed table is arranged in the bottom position; and c) for an addition operation: the height of the sheet stack feed table is adapted to match the height of the partial book block.

11. The transport device according to claim 9, wherein additional control profiles control the transport device, wherein the additional control profiles control any intermediate redirection of a partial book block out of the book channel and/or a sheet stack feed table.

12. The separating element according to claim 2, wherein transfer paths and/or the separating element comprises an integrally continuous or segmented finger chain along their conveying paths for transporting the partial book blocks.

13. The transport device according to claim 3, wherein the first separating element and/or the second separating element are configured to be either operated in a manner dependent on other feeds or autonomously.

14. The separating element according to claim 3, wherein transfer paths and/or the separating element comprises an integrally continuous or segmented finger chain along their conveying paths for transporting the partial book blocks.

15. The separating element according to claim 14, wherein the finger chain comprises carrier fingers which assume a vertical or quasi-vertical position along the partial block books that are guided lying flat and which assume a horizontal or quasi-horizontal position along the book block products that are guided standing up.

16. A transport device for stacking a plurality of partial book blocks along a transport path formed of transfer paths, wherein a finished stacked book block product is feedible to a processing machine, the transport device comprising:

a first transfer path of the transfer paths which is arranged at a start of the transport device;

at least a first separating element which is downstream of the first transfer path and is upstream of at least a second transfer path of the transfer paths;

a second separating element which is downstream of the second transfer path and is upstream of the processing machine that is operatively connected to the transport device; and a transition path which is arranged either upstream or downstream of the second separating element and within which a book block product that is to be introduced therein is transferable from a transport position where it is lying flat into a transport position where it is guided standing up;

wherein at least one of the transfer paths is equipped with at least one sheet stack feed unit and/or at least one collator-feeder, wherein the respective partial book block to be stacked is feedible from at least one sheet stack feed unit and/or one collator-feeder vertically and/or laterally with respect to a production direction of the transport device that is formed by the transfer paths, and wherein the respective partial book block to be stacked is fed laterally according to control profiles, an adapted adjustment being continuously carried out, when necessary, between a preset height of a partial book block located in the transfer path and a handover height of an additional partial book block which is guided by a height-adjustable sheet stack feed table of the sheet stack feed unit in each case.

17. The transport device according to claim 16, wherein a process of stacking assigned partial book blocks on top of one another in order to form the finished stacked book block product inside the transport device is controlled by control profiles.

18. The transport device according to claim 16, wherein the first separating element and/or the second separating element are configured to be either operated in a manner dependent on other feeds or autonomously.

19. The transport device according to claim 16, wherein at least the transfer paths are operable in a manner in which they are segmented.

20. The transport device according to claim 16, wherein a transport plane of a book channel of the transport device is formed having an inclination angle of up to 30°, 20°±5°, or up to 10°.

21. The transport device according to claim 16, wherein each partial book block to be stacked is feedible from a sheet stack feed table to a corresponding one of the transfer paths, with an inclination interdependency between the two units.

* * * * *